United States Patent [19]
Yamada

[11] 3,797,858
[45] Mar. 19, 1974

[54] FRONT SEAT BACK PROVIDING PROTECTION TO OCCUPANTS OF REAR SEATS OF A MOTOR VEHICLE

[75] Inventor: Makoto Yamada, Toyota, Japan

[73] Assignee: Toyota Jidosha Kogyo Kabushiki Kaisha, Toyota-shi, Japan

[22] Filed: July 17, 1972

[21] Appl. No.: 272,157

[30] Foreign Application Priority Data
Oct. 20, 1971 Japan.............................. 46-83119

[52] U.S. Cl. ........................... 280/150 B, 297/390
[51] Int. Cl. ........................................... B60r 21/02
[58] Field of Search............ 280/150 B; 296/63, 65; 297/390, 396, 456

[56] References Cited
UNITED STATES PATENTS
| | | | |
|---|---|---|---|
| 3,729,228 | 4/1973 | Inoue | 297/396 |
| 3,439,769 | 4/1969 | Brilmyer | 280/150 B |

Primary Examiner—Robert R. Song
Attorney, Agent, or Firm—Stevens, Davis, Miller & Mosher

[57] ABSTRACT

A front seat back providing protection to occupants of rear seats of a motor vehicle.

The front seat back comprises a skeleton of the front seat back, a main panel member covering the entire rear surface of the skeleton, reinforcing members disposed at marginal portions of the main panel member, arms for connecting the reinforcing members to the vehicle body, the main panel member and the arms being constructed such that they undergo plastic deformation when a force of impact higher than a predetermined level for each of them is exerted thereon, a horizontal slit formed substantially in the middle of the main panel member, and a buffer element made of a material which permits the buffer element to undergo plastic deformation when a force of impact higher than a predetermined level therefor is exerted thereon and superposed on the main panel member to project rearwardly and to be disposed above the horizontal slit.

4 Claims, 3 Drawing Figures

FRONT SEAT BACK PROVIDING PROTECTION TO OCCUPANTS OF REAR SEATS OF A MOTOR VEHICLE

This invention relates to a front seat back providing protection to occupants of rear seats of a motor vehicle who are not confined to the seats as by seat belt means by preventing such occupants from being thrown, when the motor vehicle is involved in a collision, over the front seat back against occupants of the front seats or an instrument panel by the force of an impact of collision and thereby suffering injuries.

Heretofore, when a motor vehicle is involved in a head-on collision or rear-end collision with another motor vehicle or a collision with any other object than motor vehicles, occupants of rear seats who are not confined to the seats as by seat belt means have tended to be caused by the force of an impact of collision to strike violently a front seat back first at the knees and then at the breast and head. The front seat back is brought to a forwardly inclined position by an impact load applied by the knees to an extent such that it becomes impossible to confine the breast and head of each occupant of the rear seats to the rear seats, with a result that the bodies of the occupants of the rear seats are thrown over the tilting front seat back against the occupants of the front seats or an instrument panel or thrown out of the vehicle through the windowpane by breaking the same. When this occurs, the occupants of the rear seats suffer sever injuries. An object of this invention is to provide a front seat back of a motor vehicle which permits the kinetic energy of motion of each occupant of the rear seats to be absorbed as much as possible in a limited space in the interior of the body of the vehicle and accordingly to reduce the loads applied to various parts of the body of the occupant at the time of collision, and which ensures that the safety of the occupants is increased by a simple mechanism.

Another object of the invention is to provide a front seat back of a motor vehicle which obviates the disadvantages of a front seat back of the prior art and provides a front seat back construction wherein a deformation of a portion thereof caused by the knees of each occupant of the rear seats at the time of collision is prevented from spreading to an upper portion thereof whereby the energy of motion of the occupant can be absorbed by the upper portion of the front seat back and the occupant can be kept from being thrown against an occupant of a front seat or an instrument panel.

Other additional objects as well as features and advantages of the invention will become evident from the description set forth hereinafter when considered in conjunction with the accompanying drawings, in which.

Figure 1:
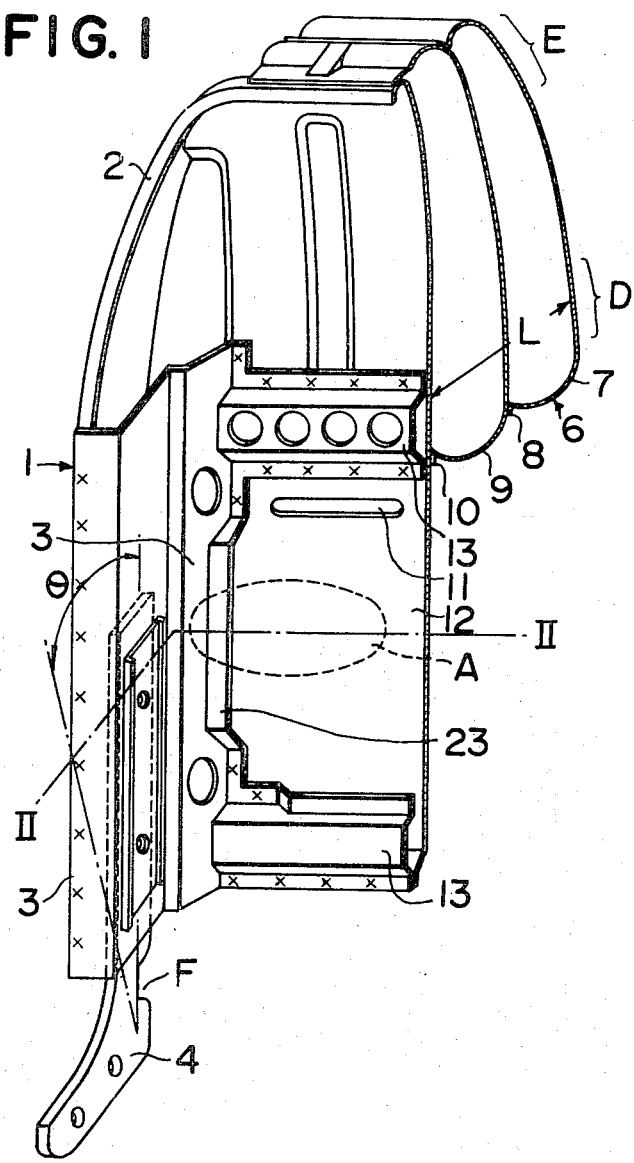
FIG. 1 is a perspective view of the front seat back according to this invention in its basic structure as seen from the front.

In FIG. 1 showing in a vertical sectional front view the essential portions of the front seat back according to this invention, 1 designates a skeleton member of the front seat back. Main panel means 2 of a dimension sufficiently great to cover the entire surface of the skeleton is provided on the skeleton member 1 to serve as a base for cushion means (not shown). Reinforcing members 3 and horizontal reinforcing members 13 made of a material larger in thickness than the material of panel means 2 are arranged at opposite sides and upper and lower marginal portions of panel means 2 respectively, the middle portion of the skeleton member of the front seat, namely, the position whereon the knee load is impressed at the time of the collision of the vehicle, comprising a single structure with the main panel means and a double structure with the reinforcing members.

Reinforcing members 3 and horizontal reinforcing members 13 are integrally joined as by spot welding at opposite lateral marginal portions and upper and lower marginal portions thereof respectively to main panel means 2 so as to prevent a deformation of a portion of main panel means 2 caused by the knees of an occupant of a rear seat violently striking it from spreading to an upper portion of the front seat back and members for mounting the front seat back on the vehicle body.

Reinforcing members 3 disposed in lower portions at opposite sides of main panel means 2 each has an arm 4 for connecting the front seat back to the vehicle body. The arms 4 of the front seat back may be directly secured to the vehicle body by a bolt-and-nut arrangement or other clamping means or may be used as arms for a seat reclining adjustor on the front seat back side.

Main panel means 2 is formed substantially in the middle, i.e., a slightly upper portion of the position whereon the knee load is impressed at the time of collision of the vehicle, with a horizontally disposed slit 11 to facilitate a deformation of this portion of the main panel means 2. Combined with reinforcing members 3 and horizontal reinforcing members 13, slit 11 is further intended to prevent the deformation from spreading to the upper portion of the front seat back.

Buffer means (hollow shock absorbing means) 6 of a dual construction comprising an upper panel 7 and a lower panel 9 of a gently sloping arcuate cross-sectional shape is superposed on main panel means 2 to project rearwardly therefrom in a position in the upper portion of the front seat back against which the occupant of the rear seat tends to strike at the breast and head at the time of collision. Buffer means 6 may be joined at marginal portions to main panel means 2 by spot welding.

Buffer means 6 is constructed such that a deceleration produced on the head and breast of the occupant of the rear seat at the time of collision is below "peak G", that a curve representing the load-deformation characteristics is in the form of a rectangular wave, and that a deformation of the buffer means does not cause irregularities to be formed in the upper portion thereof.

Buffer means 6 has been described as being of a dual construction and comprising upper and lower panels 7 and 9. It is to be understood that the invention is not limited to this construction of buffer means and that it may be a triple construction so long as it does not interfere with the riding comfort of the occupants of the rear seats.

Figure 2:
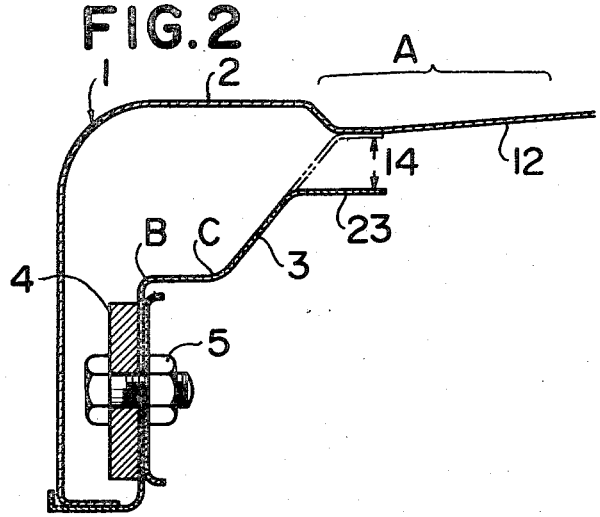
FIG. 2 is a sectional view taken along the line II—II of FIG. 1.

The reinforcing members 3 disposed at the opposite sides of main panel means 2 include inner vertical strips 23 each disposed below slit 11 and bent in the middle to be spaced apart from the rear surface 12 of main panel means 2 a distance indicated at 14 as shown in FIG. 2.

The aforementioned main panel means 2, reinforcing members 3, arms 4 and upper and lower panels 7 and 9 of buffer means 6 are constructed such that they undergo plastic deformation when the force of an impact higher than a predetermined level for each of them is exerted thereon.

When a motor vehicle incorporating this invention is involved in a head-on collision or rear-end collision with another motor vehicle or a collision with an object other than motor vehicles, the knees of the occupant of a rear seat thereof is caused by the force of an impact of collision to strike main panel means 2 near a portion thereof surrounded by broken lines as shown in FIG. 1 or a portion indicated by A in FIG. 1 and FIG. 2, and main panel means 2 begins to be deformed by an impact load of the knees. As the deformation of main panel means 2 proceeds, the portion A on the surface 12 of main panel means 2 is brought into contact with the inner vertical strip 23 of each reinforcing member 3, so that means 2 and members 3 both undergo plastic deformation. As a result of the deformation, portions B and C of each reinforcing member 3 are completely bent as shown in FIG. 3.

The provision of slit 11 of proper width and length disposed horizontally across the width of main panel means 2 above the portion A which is struck by the knees of the occupant is effective to prevent the plastic deformation of main panel means 2 caused by the impact load applied by the knees from spreading to the upper portion of main panel means 2.

Figure 3:
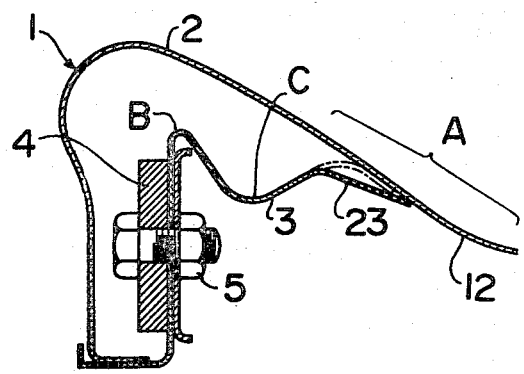
FIG. 3 is a sectional view similar to FIG. 2 but showing a deformation of the front seat back caused by an impact load applied thereto at the time of collision.

Thus, the portion of main panel means 2 below its middle portion and the portions of reinforcing members 3 which are brought into contact with the deformed lower portion of main panel means 2 are caused to undergo deformation as shown in FIG. 3 by the impact load applied by the knees. However, the skeleton 1 of the front seat back which is supported by fixed arms 4 undergoes almost no deformation, so that no deformation is caused by the deformation of main panel means 2 and reinforcing members 3 in a portion of the skeleton member 1 of the front seat back which corresponds in position to the buffer means 6 against which the head and breast of the occupant of the rear seat are thrown by the force of an impact of collision.

On the other hand, the breast of the occupant of the rear seat strikes buffer means 6 near a portion D disposed at the lower end of the upper panel 7 of buffer means 6 with a slight time lag after the knees of the occupant have struck main panel means 2. Substantially at the same time, the head of the occupant strikes buffer means 6 near a portion E at an upper end of the upper panel 7 of buffer means 6. Thus, buffer means 6 is caused to undergo plastic deformation by the impacts with which the breast and head are thrown thereagainst.

As a result, the energy of the impacts of impinging of the breast and head on buffer means 6 is absorbed by buffer means 6 having a thickness L. That is, upper panel 7 is caused to undergo deformation by the impact load applied by the breast and the impact load applied by the head, and the deformation of upper panel 7 causes lower panel 9 to undergo deformation till it is brought into contact with main panel means 2.

Therefore, an impact load is applied by the entire body of the occupant to the skeleton member 1 of the front seat back in addition to the impact load applied by the knees, breast and head, so that a portion F of each fixed arm 4 shown in FIG. 1 undergoes plastic deformation, so that the skeleton member 1 of the front seat back is inclined forwardly through an angle $\theta$. Thus, the impact loads applied to various portions as aforementioned are absorbed during the process of plastic deformation of the skeleton member 1 and fixed arms 4 of the front seat back whereby the occupant of the rear seat can be prevented from suffering severe injury.

The front seat back according to this invention is constructed as aforementioned. It will be appreciated that, when a motor vehicle incorporating this invention is involved in a collision with another motor vehicle or any other object, an impact load applied by the knees of an occupant of a rear seat thereof who is not confined to the seat as by seat belt means to the lower portion of main panel means 2 is absorbed by the plastic deformation of such portion. Combined with the provision of slit 11, the provision of reinforcing members 3 permits no influence of collision to be exerted on buffer means 6 because reinforcing members 3 are mounted such that a portion of each member 3 which is struck by the knees is open in cross-section. Thus, the impact load applied by the head and breast of the occupant are primarily absorbed by buffer means 6 satisfactorily, and the impact load applied by the head, breast and other parts of the body are secondarily absorbed by fixed arms 4 as they undergo plastic deformation.

In this way, the invention permits the forces of impacts of collision to be absorbed as much as possible in the narrow interior of the vehicle body. The forces of impacts of collision with which the body of the occupant is thrown forwardly against the front seat back can be absorbed step by step. This is conducive to reduced loads and deceleration to which various parts of the body are subjected.

The invention enables one to attain the end of providing an occupant of a rear seat with increased safety at the time of collision by a simple construction which is reliable in performance and low in cost.

What is claimed is:

1. A front seat back providing protection to occupants of the rear seats of a motor vehicle comprising:

a skeleton means for the front seat back, said skeleton means including a main panel means wholly covering the back of the front seat back and a reinforcing member positioned along the peripheral edge of said main panel means, the portion of the skeleton means wherein a knee load is impressed having a single structure of said main panel means and the peripheral edge thereof having a double structure composed of said main panel means and said reinforcing member;

arms connecting said reinforcing member to the motor vehicle side, said reinforcing member, main panel means and arms being constructed such that they are subjected to plastic deformation when a force of impact higher than a predetermined level for each of them is exerted thereon;

a slit cut horizontally at a slightly higher portion of the portion of said main panel means whereon the knee load is impressed at the time of collision, and a buffer means made of a material which permits the buffer means to undergo plastic deformation when a force of impact higher than a predetermined level therefor is exerted thereon, said buffer means superposed on said main panel means to project rearwardly and disposed above said horizontal slit.

2. A front seat back as set forth in claim 1 wherein said arms are arms of a seat reclining adjustor on the front seat back side.

3. A front seat back as set forth in claim 1 wherein said buffer means is of a dual construction and comprises an upper panel and a lower panel.

4. A front seat back as set forth in claim 1 wherein said reinforcing member comprises:

an inner vertical strip being disposed on a surface of said main panel means and bent in the middle to be spaced apart from the rear surface of said main panel means to provide a clearance therebetween; and horizontal reinforcing elements extending horizontally from the top and bottom portions of said vertical strip and being disposed on said surface of said main panel means and bent in the middle to be spaced apart from the rear surface of said main panel means to provide a clearance therebetween.

* * * * *